Figure 1:
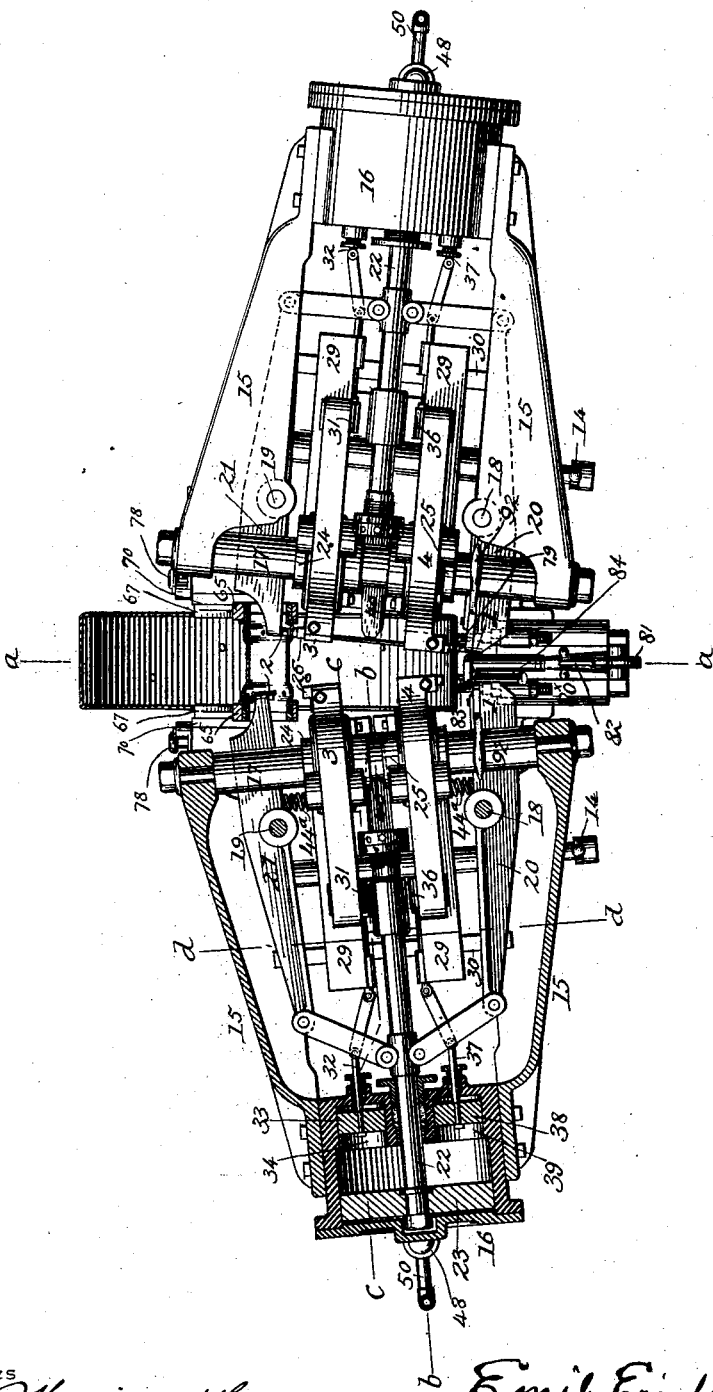

No. 700,025. Patented May 13, 1902.
E. EINFELDT.
MACHINE FOR MAKING METAL WHEELS.
(Application filed Aug. 26, 1901.)
(No Model.) 9 Sheets—Sheet 1.

No. 700,025. Patented May 13, 1902.
E. EINFELDT.
MACHINE FOR MAKING METAL WHEELS.
(Application filed Aug. 26, 1901.)

(No Model.) 9 Sheets—Sheet 2.

No. 700,025. Patented May 13, 1902.
E. EINFELDT.
MACHINE FOR MAKING METAL WHEELS.
(Application filed Aug. 26, 1901.)
(No Model.) 9 Sheets—Sheet 3.

No. 700,025. Patented May 13, 1902.
E. EINFELDT.
MACHINE FOR MAKING METAL WHEELS.
(Application filed Aug. 26, 1901.)
(No Model.) 9 Sheets—Sheet 4.
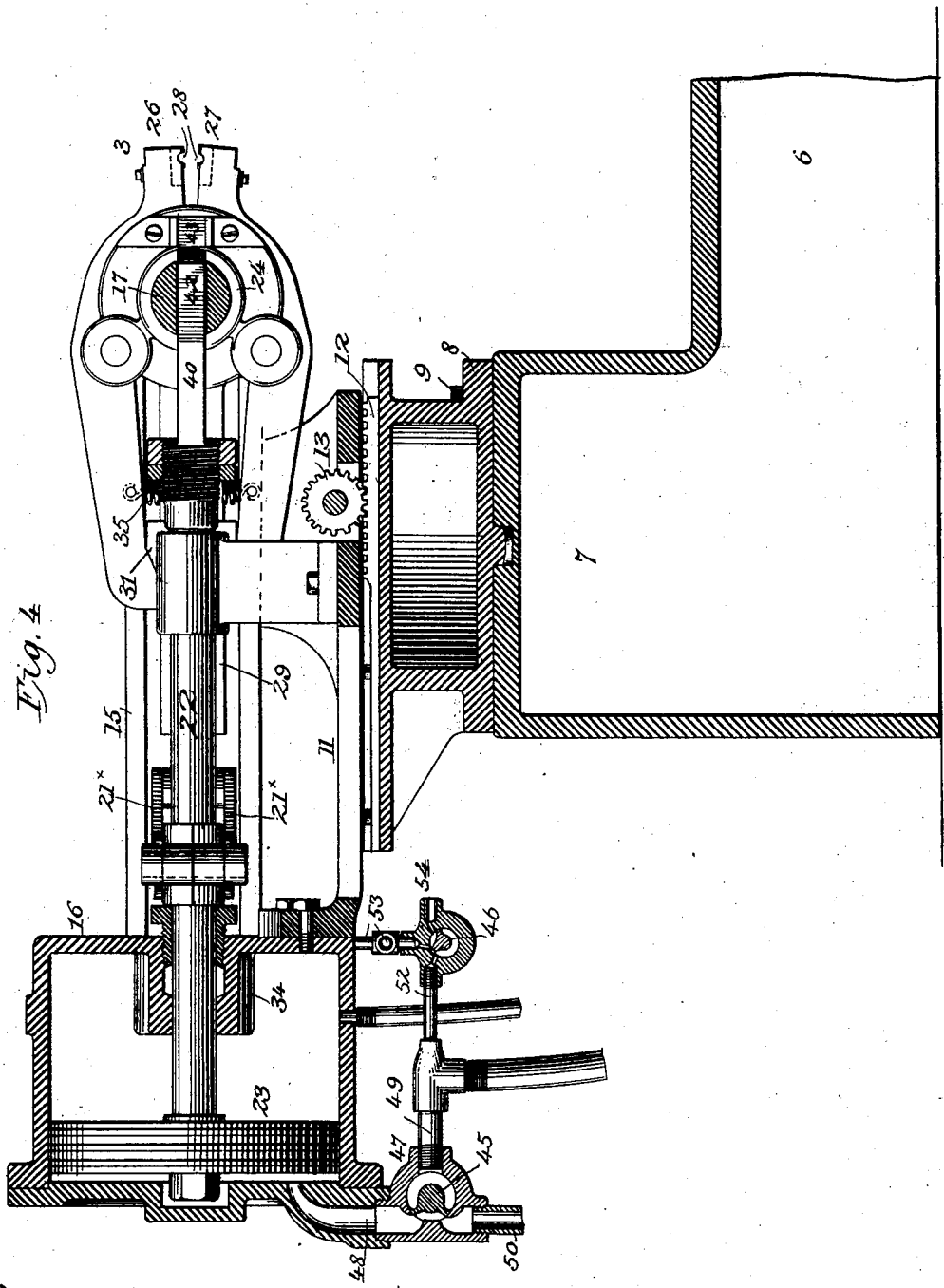

No. 700,025. Patented May 13, 1902.
E. EINFELDT.
MACHINE FOR MAKING METAL WHEELS.
(Application filed Aug. 26, 1901.)
(No Model.) 9 Sheets—Sheet 5.
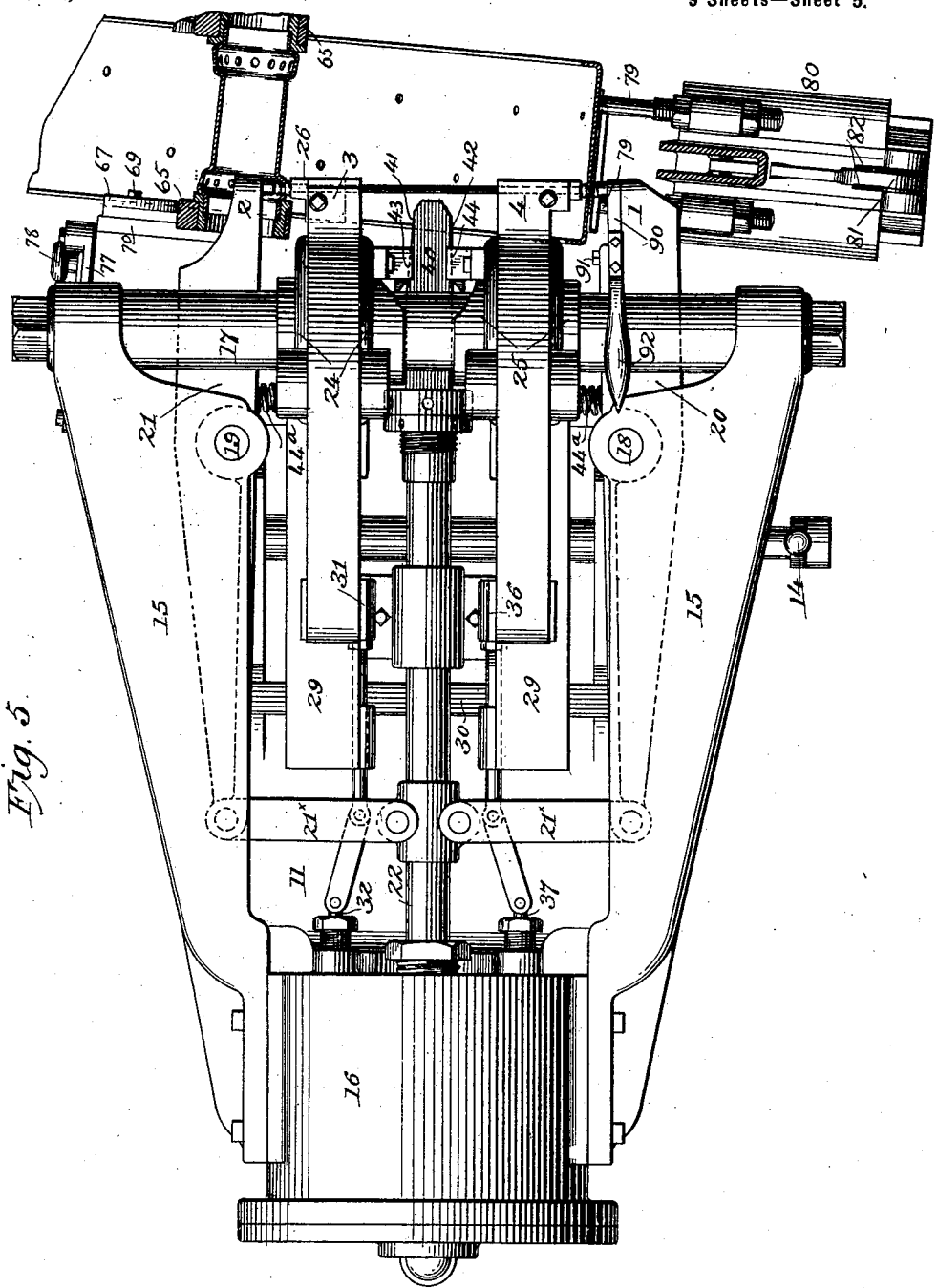

No. 700,025. Patented May 13, 1902.
E. EINFELDT.
MACHINE FOR MAKING METAL WHEELS.
(Application filed Aug. 26, 1901.)
(No Model.) 9 Sheets—Sheet 6.
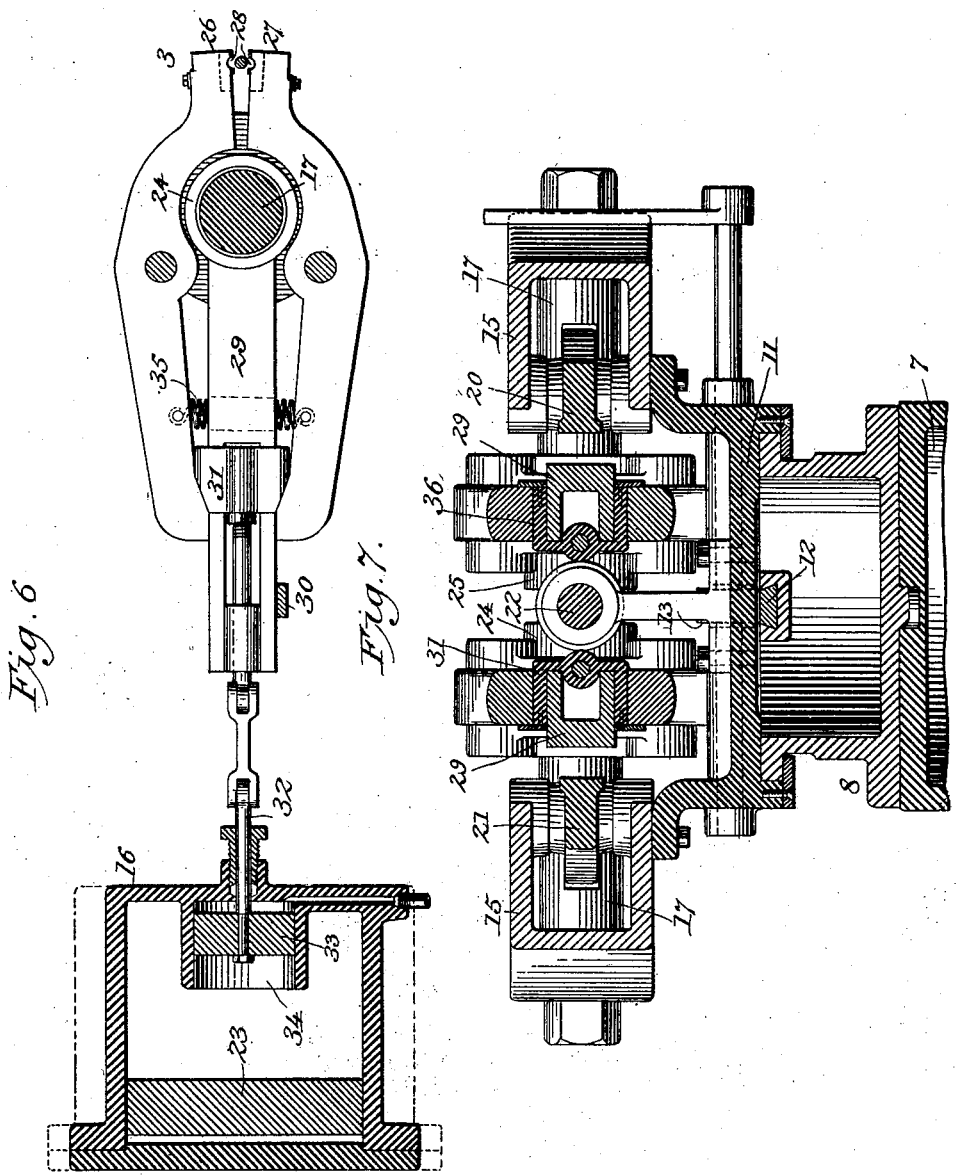

No. 700,025. Patented May 13, 1902.
E. EINFELDT.
MACHINE FOR MAKING METAL WHEELS.
(Application filed Aug. 26, 1901.)

(No Model.) 9 Sheets—Sheet 7.

Witnesses
Sidney P. Hollingsworth
M. A. Kennedy

Emil Einfeldt, Inventor
By P. F. Dodge, Attorney

THE NORRIS PETERS CO., PHOTO-LITHO., WASHINGTON, D. C.

No. 700,025. Patented May 13, 1902.
E. EINFELDT.
MACHINE FOR MAKING METAL WHEELS.
(Application filed Aug. 26, 1901.)
(No Model.) 9 Sheets—Sheet 8.
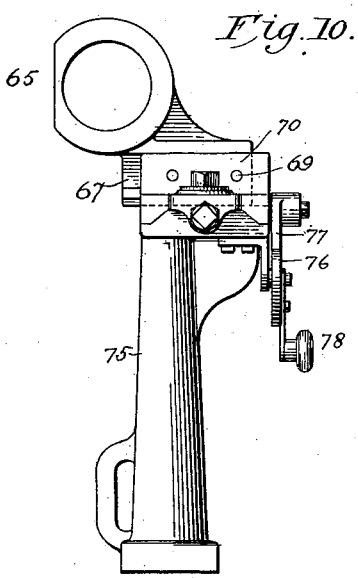
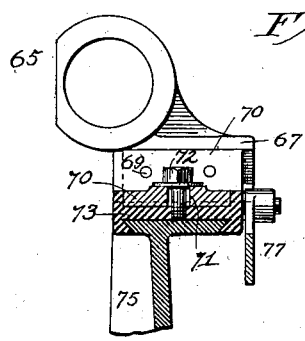
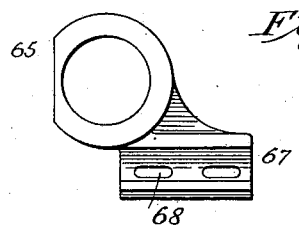
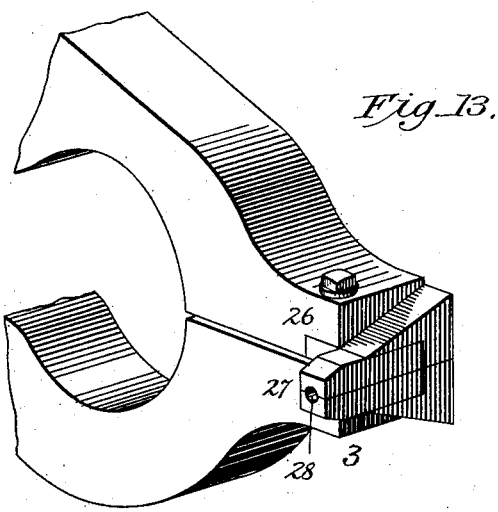
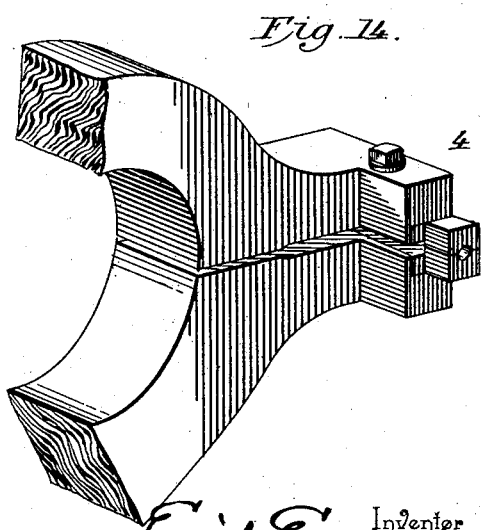

No. 700,025. Patented May 13, 1902.
E. EINFELDT.
MACHINE FOR MAKING METAL WHEELS.
(Application filed Aug. 26, 1901.)
(No Model.) 9 Sheets—Sheet 9.

Witnesses
Inventor
Emil Einfeldt
By P. C. Dodge
Attorney

THE NORRIS PETERS CO., PHOTO-LITHO., WASHINGTON, D. C.

UNITED STATES PATENT OFFICE.

EMIL EINFELDT, OF DAVENPORT, IOWA, ASSIGNOR TO BETTENDORF METAL WHEEL COMPANY, A CORPORATION OF ILLINOIS.

MACHINE FOR MAKING METAL WHEELS.

SPECIFICATION forming part of Letters Patent No. 700,025, dated May 13, 1902.

Application filed August 26, 1901. Serial No. 73,228. (No model.)

*To all whom it may concern:*

Be it known that I, EMIL EINFELDT, of Davenport, county of Scott, and State of Iowa, have invented a new and useful Improvement in Machines for Making Metal Wheels, of which the following is a specification.

This invention relates to a machine for use in the manufacture of metal wheels, and it is designed more particularly for fastening the spokes to the hub and rim. Machines now in use for this purpose embody mechanism for forming shoulders on the spoke between the hub and the rim by upsetting the spoke at the inner side of the rim or at the outer side of the hub. This action shortens the spoke, and by reason of the fact that spokes frequently vary in diameter and structure the shortening is unequal, so that the circular form of the rim is destroyed.

The chief aim of my invention is to overcome these objections; and it consists, mainly, of mechanism adapted to act on the spoke between the hub and the rim and to force the material of the spoke in the form of a shoulder against the adjacent member of the wheel without varying the length of the spoke between the hub and rim.

The invention consists also in combining with mechanism of this character means adapted to act on the outer ends of the spoke and form heads thereon, whereby the spoke may be secured to both the hub and rim without varying the length of the same between the hub and rim.

The invention consists also in mechanism designed particularly for the production of "staggered" wheels, in which the spokes are secured to the hub in two series, duplicate mechanisms being provided and adapted to act alternately on the spokes of the two series.

The invention consists also in the details of construction and combination of parts hereinafter described and claimed.

Figure 2:
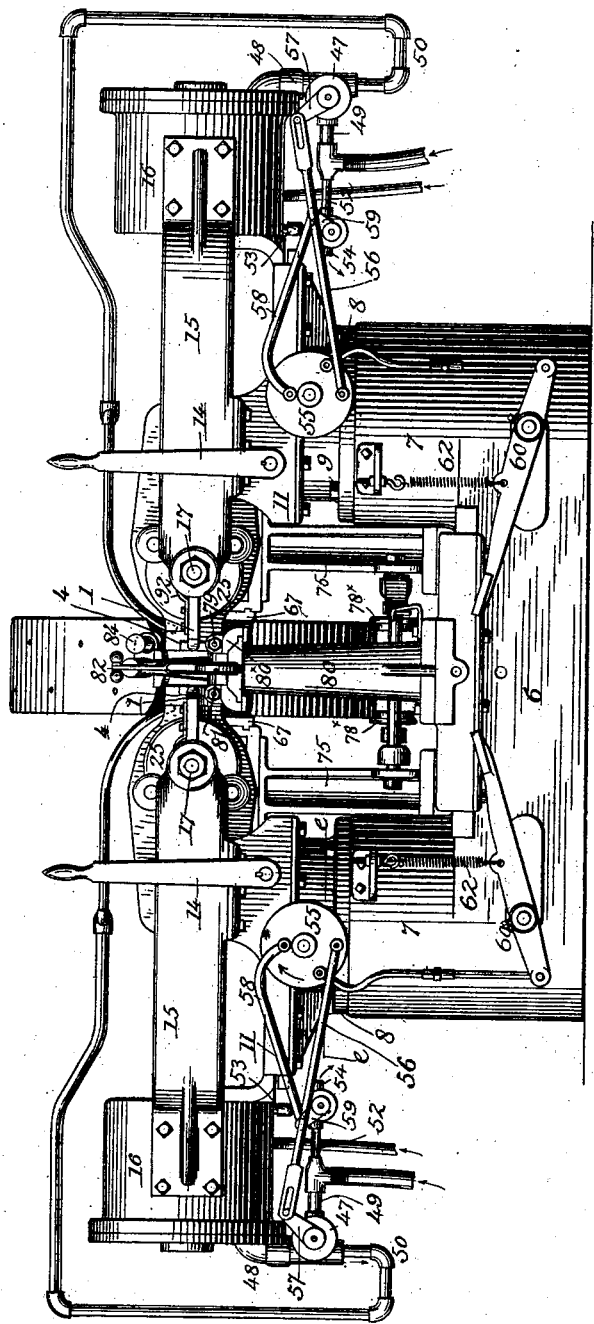
Figure 3:
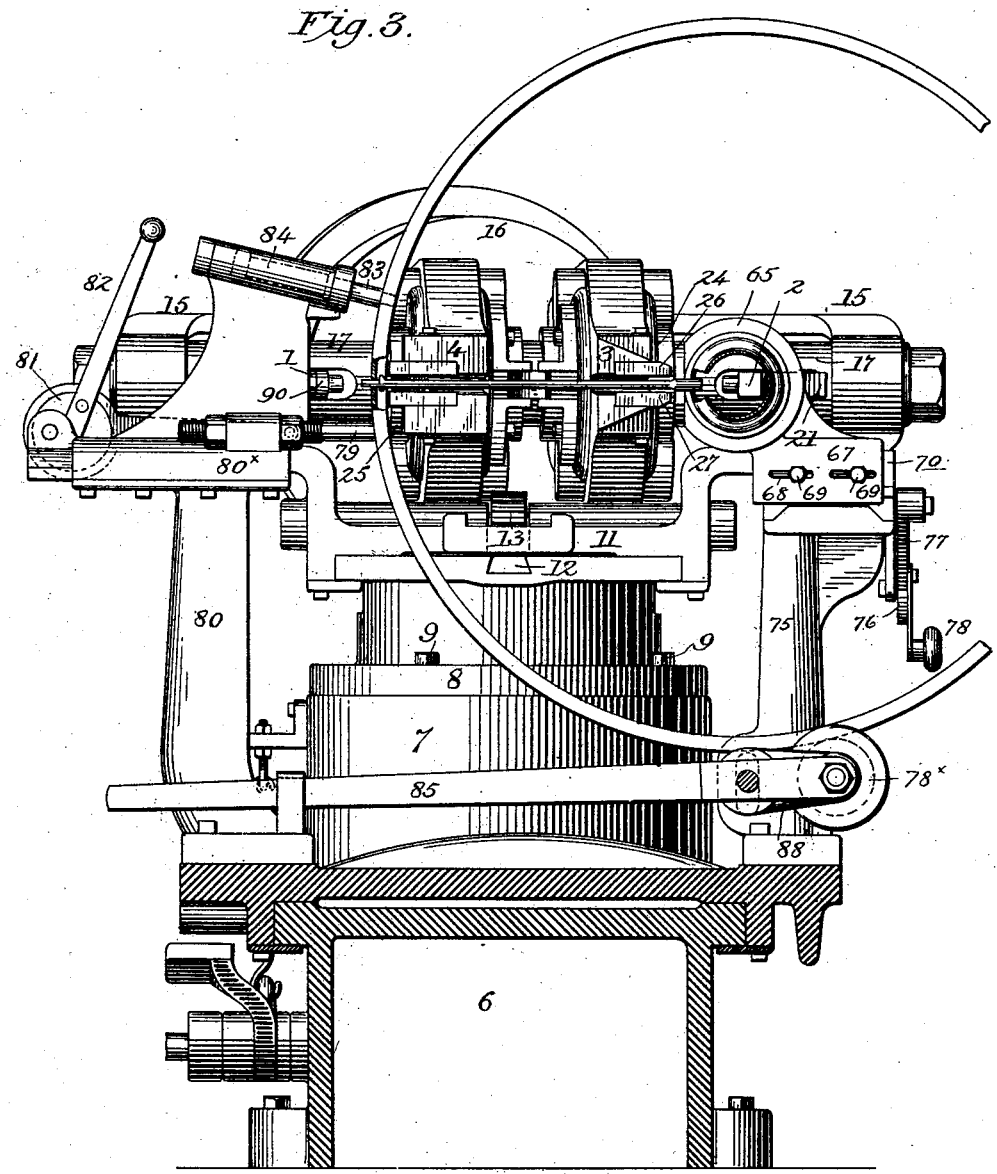
Figure 8:
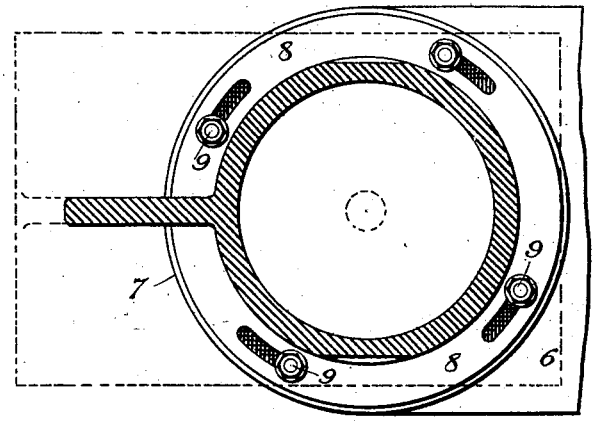
Figure 9:
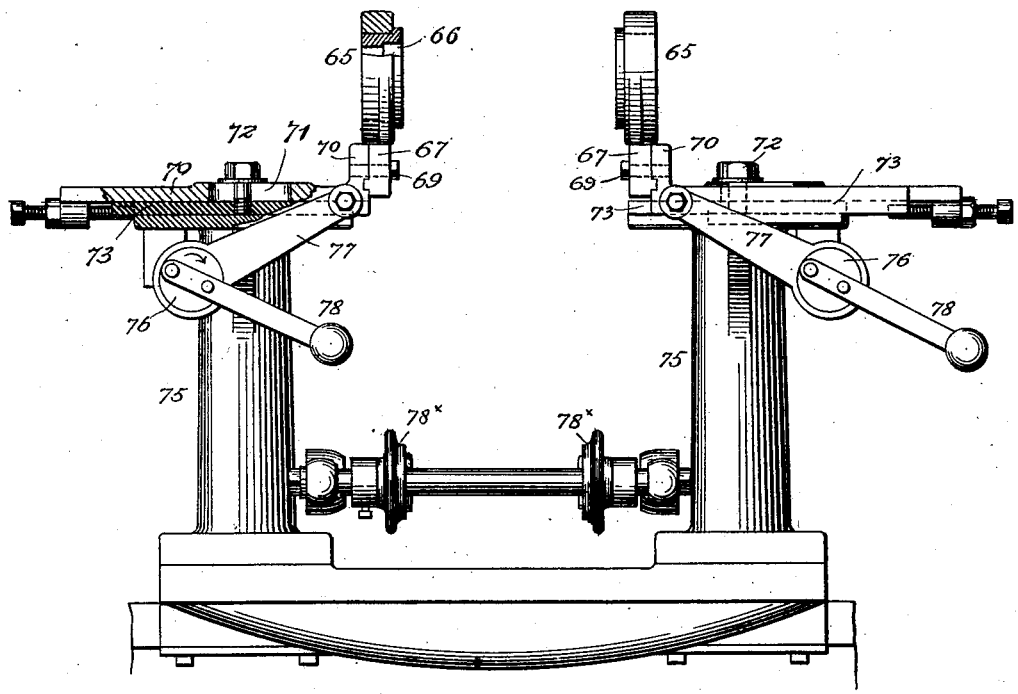
Figure 15:
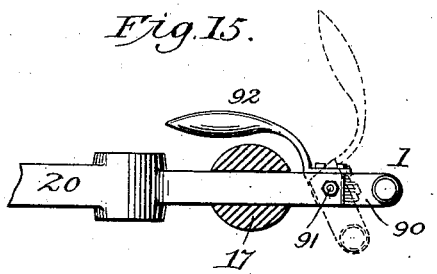
Figure 16:
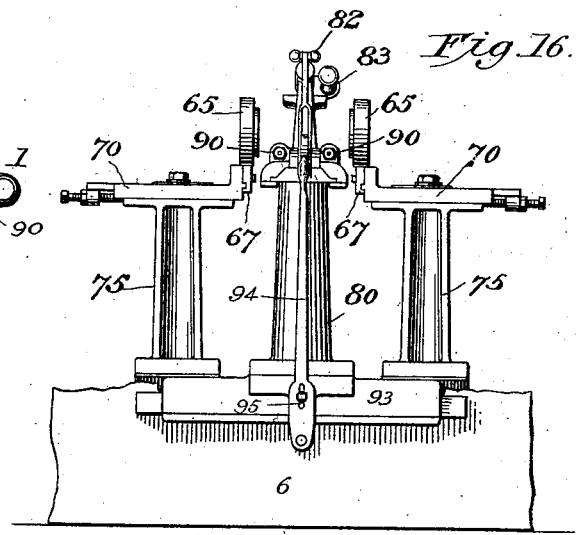
Figure 17:
Figure 18:
Figure 19:
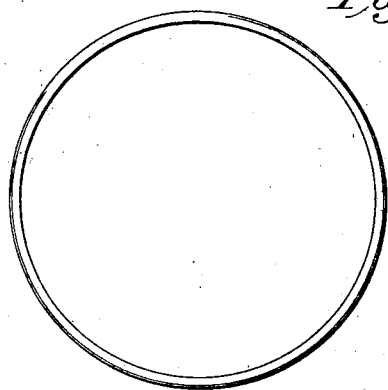
Figure 20:
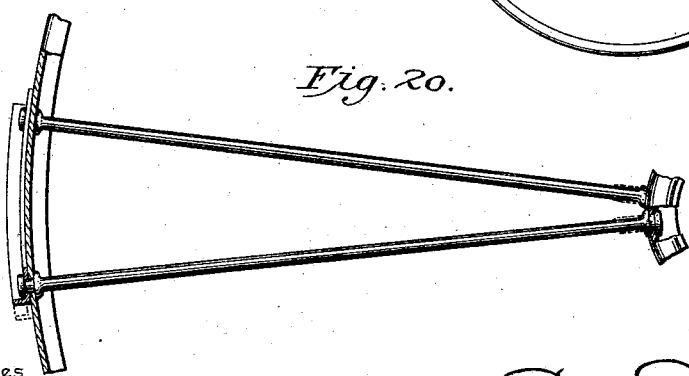

Referring to the drawings, Figure 1 is a top plan view, on a reduced scale, of the machine with parts of one of the spoke-fastening mechanisms in section. Fig. 2 is a front elevation of the same. Fig. 3 is a vertical cross-sectional elevation on the line $a\ a$ of Fig. 1. Fig. 4 is a longitudinal vertical sectional elevation on the line $b\ b$ of Fig. 1. Fig. 5 is a top plan view of the same. Fig. 6 is a vertical longitudinal section on the line $c\ c$ of Fig. 1. Fig. 7 is a vertical transverse section on the line $d\ d$ of Fig. 1. Fig. 8 is a horizontal section on the line $e\ e$ of Fig. 2. Figs. 9 to 12 are detailed views of the hubholder. Fig. 13 is a perspective view of the scraping-clamp. Fig. 14 is a perspective view of the jamming-clamp. Fig. 15 is a view of the heading-tool for operating on the end of the spoke outside of the rim, showing how it may be moved to admit of the insertion of the rim of the wheel between it and the jamming-clamp. Fig. 16 is an elevation of a modification by which the hub and rim and the inserted spoke are moved up to the spoke-fastening devices. Fig. 17 is a view of the spoke before it is acted on by the machine. Fig. 18 is a view of the hub. Fig. 19 is a view of the rim. Fig. 20 is a view of a part of the completed wheel.

In the accompanying drawings in its preferred form my improved machine is adapted to secure the spokes in place in staggered relations to produce a staggered wheel in which the spokes radiate from the hub in two lines or series alternating with each other; but the invention is applicable as well for the production of wheels with a single central series of spokes, as will be described later on. For this purpose, that of the production of staggered wheels, the machine embodies duplicate mechanisms adapted to act alternately on the spokes of the two series, which mechanisms comprise a heading-tool 1, adapted to form a head on the outer end of the spoke outside the rim, a heading-tool 2, adapted to form a head on the spoke inside the hub, a clamp or die 3, which for convenience of description I term a "scraping-clamp," the action of which is to scrape up the external material of the spoke and form a shoulder at the outside of the hub, and a clamp or die 4, which for convenience of description I term a "jamming-clamp," the function of which is to jam up against the rim a previously-formed shoulder on the spoke, the combined actions of these mechanisms resulting in the formation of heads and shoulders, respectively, at the outer ends of the spokes and the inner side of the rim and outer side of the hub, which will fasten the spokes firmly and securely to the rim and hub without changing the length of the spoke between the hub and rim. These mechanisms are supported by a frame consisting of a base-plate 6, from the opposite ends of which rise two posts or standards 7. On the upper end of each standard is mounted a circular table 8, secured to the standard by bolts 9, extending through slots in the table, so that the latter may be adjustable to a limited extent around a vertical axis for a purpose which will presently appear. The top of the table is formed with horizontal guides in which is mounted a frame or casting 11, movable by means of a rack 12 on the table engaged by a pinion 13, mounted on the sliding frame and operated by a hand-lever 14, by which the frame may be moved back and forth on the table. This sliding frame is provided with two horizontal arms 15 of C form in cross-section, bolted at their outer ends to the sides of a cylinder 16, supported at the outer end of the frame 11, and connected at their opposite ends to a horizontal cross-bar 17. Mounted within the arms 15, respectively, on vertical axes 18 and 19 are horizontal levers 20 and 21, which extend through slots in the cross-bar, the lever 20 carrying on its outer end beyond the cross-bar the heading-tool 1 and the lever 21 carrying on its outer end the heading-tool 2, before alluded to. The outer ends of these levers are connected, by means of links $21^\times$, to a piston-rod 22, connected with a large piston 23 within the cylinder 16, the forward movement of this piston serving to straighten out the links, separate the outer ends of the levers, and move the heading-tools inward.

Between the two levers 20 and 21 the horizontal bar 17 is loosely encircled by collars 24 and 25, carrying, respectively, the scraping-clamp 3 and the jamming-clamp 4. The scraping-clamp comprises an upper jaw 26 and a lower jaw 27, pivoted between their ends to the collar 24 and extending forward on opposite sides of the cross-bar, where they are provided in adjacent faces with grooved clamping-surfaces 28, adapted when the jaws are closed to firmly embrace the spoke. The rear ends of these jaws extend above and below a rearward extension 29 of the collar, supported by a cross-rod 30, and they are adapted to be acted on and separated to close the jaws by means of wedges 31, sliding on the extension 29 and jointed to the forward end of the piston-rod 32, the rear end of which is connected with a small piston 33 in a cylinder 34, situated within the large cylinder, with its rear end open to the pressure therein. As a result of this arrangement when the piston 33 moves rearward the wedges will be retracted and acting on the adjacent faces of the rear ends of the jaws they will be separated and the jaws will be closed on the spoke. On the forward movement of the piston the rear ends of the jaws will be drawn together and the jaws opened by means of a tension-spring 35 connecting them.

The jamming-clamp is similar in construction to that described, comprising upper and lower jaws pivoted to the collar 25 and operated by wedges 36, jointed to a piston-rod 37, connected with a piston 38 in a second small cylinder 39, the advance and retreat of the piston serving to open and close the jaws in a manner similar to the scraping-clamp.

After the clamps described are closed on the spoke it is necessary, in order that they may act to respectively scrape up the material of the spoke against the outer side of the hub and jam up the previously-formed shoulder against the inner side of the rim, that they move bodily outward toward the ends of the spoke. This is accomplished by a central wedge-shaped sliding head 40, which extends horizontally through a slot in the cross-bar 17 and is formed on its opposite sides with oppositely-inclined surfaces 41 and 42, adapted to act, respectively, against inclined surfaces 43 and 44 on the adjacent sides of the two collars 24 and 25 and force these collars outward in opposite directions, thereby moving the clamps outward toward the ends of the spoke. As a result of this action the scraping-clamp will throw or force up the external material of the spoke in the form of a shoulder against the outer sides of the hub, the spoke at this point being preferably thickened, so as not to reduce its diameter, while the jamming-clamp will force the previously-formed shoulder firmly against the inner side of the rim.

By reason of the fact that a longer movement of the scraping-clamp than that of the jamming-clamp is necessary on account of the different character of the work they perform the surface acting on the collar 24 is given a greater inclination than the opposite surface, so that for the same movement of the wedge-shaped head the two clamps are moved different distances. The advance of the wedge-shaped head to thus move the clamps outward is effected by the forward movement of the large piston 23, the rod of which is extended forward beyond the links $21^\times$ and has the wedge-shaped head connected with it. On the retraction of this piston the two clamps are returned inward to their former positions by means of spiral springs $44^a$, seated between the outer sides of the collars and adjacent faces of the levers carrying the heading-tools. It is observed, therefore, that the advance of the large piston acts to operate both the heading-tools and clamps simultaneously, the heading-tools being moved inward toward each other and upsetting the outer ends of the spokes at the same time that the clamps are moved outward and form the shoulders at the inner side of the rim and at the outer side of the hub.

A constant pressure, say, of fifteen pounds is maintained in the cylinder 16, acting on the front of the large piston and rear of the small pistons, which pressure holds the wedges 31 forward with the jaws opened, the heading-tools outward, and the clamps inward. In the operation of the mechanism a pressure, say, of fifty pounds is admitted in front of the small pistons and in rear of the large pistons, the effect of which is to retract the small pistons and close the clamping-jaws on the spoke and then to advance the large piston, operate the headers, and move the clamps outward. The constant low pressure acting on all the pistons serves to quickly effect the exhaust of the cylinders and the return of the pistons to their former positions when the high pressure is cut off.

The control of the pressure to the cylinders is effected by valves 45 and 46, the valve 45 controlling the admission to and the discharge of the pressure from the large cylinder, while the valve 46 controls the pressure to the small cylinders.

The valve 45 is mounted in a casing 47, from which a pipe 48 leads to the cylinder in rear of the large piston, a second pipe 49 leading to the source of high pressure and a third pipe 50 conducting away the exhaust. The valve is so formed with relation to the casing and pipes leading thereto that when in one position communication is established between the source of pressure and the cylinder and when in another position this communication is cut off and the exhaust is opened. The other valve 46 is mounted similarly in a casing connected with the source of pressure by a pipe 52 and with the small cylinders by pipes 53, an opening 54 being provided in the casing for the exhaust of the cylinders. These two valves are operated from a wrist-plate 55, mounted on the table 8 and connected by a rod 56 with a crank 57 on the valve 45 and connected also by a rod 58 with a crank 59 on the valve 46, the arrangement being such that when the wrist-plate is turned in the direction of the arrow by pressure on a foot-lever 60 the first part of the stroke will operate valve 46 and admit pressure to the small cylinders, causing the pistons to move rearward and close the clamping-jaws on the spoke. The second part of the stroke operates the valve 45 and admits pressure to the large cylinder, causing its piston to advance and resulting in the outward movement of the clamping-jaws to form the shoulders and the inward movement of the heading-tools to upset the ends of the spoke. On the release of the foot-lever a spring 62 returns the same to its former position, the first part of the return stroke operating to cut off pressure to the small cylinders, and the pistons of each will be advanced by the central pressure behind them and will permit the clamping-jaws to be opened by their springs. The second part of the return stroke will cut off pressure and open the exhaust to the large cylinder, the piston of which will be returned by the central pressure, and this action will result in the outward movement of the heading-tools and the inward movement of the clamping-jaws.

The duplicate mechanisms described face each other, as shown in Fig. 1, so that the clamps and headers of each mechanism may operate alternately on the spokes of the two series to secure them in the rim and hub, and as the two series of spokes are inclined toward each other as they approach the rim it is necessary that the two mechanisms be inclined one with respect to the other, the opposing headers for the rim end of the spoke being nearer together than the opposing headers which operate on the spokes inside the hub. The degree of this relative inclination of the two mechanisms may be varied by adjusting their supporting-tables 8 on vertical axes on the standards 7 by means of the adjusting-bolts 9, before alluded to. The mechanisms may be adjusted parallel to each other if it is desired to set the two series of spokes parallel.

In the operation of the machine the hub in which the spokes are to be inserted is held in a horizontal position between the opposing headers 2, so that by the operation of the hand-lever 14 these headers may be moved alternately within the ends of the hub to the proper positions to act on the ends of the spokes of the two series. A hub-holder for this purpose comprises two vertical rings 65, provided in their adjacent faces with grooves 66, in which the ends of the hub are adapted to seat, and each ring rising from a plate 67, provided with slots 68 and connected by bolts 69 with a frame 70, so that the rings may be adjusted in a direction transversely of the axis of the hub in the line of the spokes in order to provide for wheels of different sizes. The frame 70 is provided with slots 71 and connected by bolts 72 with an underlying slide 73, so that the hub-holding rings by this means may be adjusted to and from each other to provide for hubs of different lengths. The slide 73 is mounted in guides on the upper end of a standard 75, rising from the bed of the machine, and is movable in said guides in the direction of the axis of the hub, so that the two rings may be separated to admit of the insertion or removal of the hub and brought together to clamp and hold the hub in position. This movement of the slides 73 is controlled by eccentrics 76, mounted in the standards, and each connected by a link 77 with the inner end of the slide 73, the arrangement being such that when the eccentric is turned by means of a hand-lever 78 in the direction of the arrow, Fig. 9, the slide and the ring carried thereby will be moved toward the opposing ring and locked in this position. By this means the hub-holding rings may be moved with relation to each other and independently of each other to admit of the ready insertion of the hub. The rim to which the outer ends of the spokes are secured is set in the machine between the duplicate mechanisms, resting at its lower part on a transverse roller 78× and at its outer side against two horizontally-adjustable gage-pins 79, projecting inwardly from the upper end of a slide 80× on a vertical standard 80, rising from the base of the machine adjacent to the heading-tools 1, the relative location and arrangement of the parts being such that the rim when in position will extend between the jamming-clamps and the headers 1. The slide 80× is operated by an eccentric 81, actuated by a hand-lever 82, the construction being such that when the hand-lever is thrown forward toward the rim the slide will be moved in the same direction and locked in position. This slide carries on its upper end a spring-actuated pin 83, adapted to extend in one of the previously-formed holes in the rim, and serves to hold and steady the rim after it is set in its proper position with relation to the hub to receive the spoke. The spring-pin is carried on the outer end of an arm 84, pivoted at its inner end to the slide, so that it may be swung over from side to side in order that the pin may be inserted in either of the two series of holes in the rim, according to the side of the rim where the spoke is being fastened. The roller 78×, on which the rim rests at its base, is movable vertically by means of a foot-lever 85, pivoted between its ends on the base of the machine and connected at its inner end to a frame 88, in which the roller is mounted, so that the rim may be moved vertically to its proper position with relation to the hub in beginning the operation of seating the spoke in place. After one or two of the spokes have been secured they will maintain the proper relations of the rim and hub, so that the further vertical movement of the roller will not be necessary, its function then being to support the rim and permit it to be readily shifted in position as the successive spokes are set in place.

The particular machine described is adapted to operate on spokes having at the hub end a thickened portion to be scraped up in the form of a shoulder against the outer side of the hub, a previously-formed shoulder at the rim end to be jammed up against the inside of the rim, and a tenon beyond this shoulder to be inserted through the hole in the rim.

The rim to which the spokes are to be secured has its ends connected and is provided with two series of holes alternating with each other to receive the outer tenoned ends of the two series of spokes, while the hub is formed with two series of alternating holes to receive the inner thickened ends of the spokes, the distance between the two series of holes in the hub being somewhat greater than that between the holes in the rim, so that a staggered wheel will be produced.

In the operation of the mechanism to fasten together the rim, hub, and spokes the duplicate mechanisms are moved outwardly on their supporting-beds by the hand-levers 14. Pressure is cut off from the several cylinders, so that the scraping and jamming clamps will be opened and at their inner positions, and the heading-tools in their outer positions. The hub-holding rings are separated to admit of the insertion of the hub, and the slide 80×, carrying the gage and spring-pin, is retracted. The rim is now inserted in place in the machine and set in its approximate position, its edge being passed between the heading-tools 1 and jamming-clamps and its base resting on the roller 78×. A hub is now set in position between the hub-holding rings and their operating-levers actuated to cause them to approach each other and embrace the ends of the hub, in which position they are locked. A spoke is next placed in position, its thickened end inserted in a hole in one of the series in the hub and its outer end passed through a hole of the corresponding series in the rim, the foot-lever 85 being operated to raise the rim to the proper position with relation to the spoke and hub. Hand-lever 82 is now operated to move up the slide 80 to bring the gage-pins to bear against the side of the rim, and the spring-pin carried by the slide is inserted in one of the holes in the rim of the series in which the spoke extends. The parts of the wheel are now in position ready to be acted on by the headers and clamps to secure them firmly together. Hand-lever 14 on that side of the machine nearest the inserted spoke is operated to move the clamps and headers into active relation to the spoke, the header 2 extending inside the hub opposite the end of the spoke, the header 1 extending opposite the other end of the spoke outside the rim, and the open jaws of the clamps extending above and below the spoke adjacent, respectively, to the thickened portion and the previously-formed shoulder thereon. Foot-lever 60 is now depressed, the first part of the stroke admitting pressure to the small cylinders and causing the clamps to close firmly on the spoke and the final part of the stroke admitting pressure to the large cylinder, causing the scraping and jamming clamps to move outward and the headers to simultaneously move inward, the jamming-clamp jamming up the previously-formed shoulder against the inner side of the rim, the scraping-clamp forcing and scraping up the thickened portion of the spoke against the outer side of the hub in the form of a shoulder, and the heading-tools upsetting the outer ends of the spoke, respectively, outside the rim and inside the hub. The operation is now completed and foot-lever 60 is released, the first part of the return stroke cutting off pressure to the small cylinders and permitting them to be exhausted by the central pressure in rear of the same. The small pistons will then advance and permit the clamps to be opened by their springs. The second part of the return stroke will cut off pressure to the large cylinder, and this exhausting will retract the piston, which will positively separate the headers and permit the clamps to be moved inward to their original positions by their springs. The spring-pin is now disengaged from the rim, and the latter, with the spoke and hub, is shifted to bring the next hole of the other series in position to receive its spoke. A new spoke is now inserted in this hole and the spring-pin 83 shifted on its axis to the other side of the rim and entered in one of the holes of the series in which the new spoke is inserted. The hand-lever 14 of the other mechanism is now operated to advance its clamps and headers in active relation to the newly-inserted spoke, after which the foot-lever 60 of this mechanism is depressed, causing first the closing of the clamps on the spokes and then the simultaneous heading of the spoke and the formation of the inner shoulders, as before. The spoke and rim are now released and another spoke of the first series set in place and fastened and these operations repeated until all the spokes are fastened in position, the two mechanisms acting alternately on the spokes of the two series, one remaining out of action while the other is performing its functions, and vice versa. It is obvious that this duplicate arrangement of the parts to secure their alternate action while being preferable for "staggered" wheels is not essential, for a single mechanism may be employed more particularly for securing the spokes to the hub and rim in a single series, and it is to be understood that my invention is intended to embrace this arrangement as well as that described and illustrated.

Wheels of the character described as being produced by this machine are in many cases provided with flanges on the edges of the rim, and by reason of the proximity of the header 1 and the jamming-clamp this flange prevents the rim from being readily set in position between the clamp and header. To provide for such a contingency, I so secure the header 1 to its operating-lever that it may be shifted in position to leave a space for the passage of the flange. This is effected by mounting the header on a block or plate 90, pivoted to the end of the lever 20 on a horizontal axis 91, a hand-lever 92 being attached to the block for turning it on its axis and carrying the heading-tool downward to leave room for the insertion of the flange.

In Fig. 16 I have illustrated a modification of the mechanism for presenting the headers and clamps and the spokes in active relations to each other. Here it will be seen that instead of holding the spoke, hub, and rim and moving the clamps up to them I reverse the operation and move the hub, spoke, and rim up to the headers and clamps. This is effected by mounting the hub-holder and the standard carrying the gage and spring-pins on a slide 93, movable back and forth on the base of the machine in the direction of the axis of the hub, a vertical lever 94 being pivoted at its lower end to the base of the machine and provided with a slot 95, in which a pin on the slide engages. By the operation of this lever the slide may be shifted back and forth to carry the hub or rim and inserted spoke to one or the other of the two mechanisms, according to the position in which the spoke is to be inserted.

I prefer in the operation of the machine to heat one or both ends of the spokes before they are acted on by the headers and clamps, for the reason that the mechanisms will operate more satisfactorily and there will be less liability of fracture at the points where the heads and shoulders are formed. Further, this method of procedure is advantageous in that the spokes will be placed under tension by reason of their contraction by cooling and a "tension-wheel" will be produced.

The essence of my invention resides in the means for forcing up the material of the spoke between the hub and rim in the form of a shoulder into engagement with the adjacent member of the wheel without disturbing the internal material of the spoke or changing the length of the spoke between the hub and the rim, and while I have illustrated a form of mechanism which I prefer to employ for effecting this result it will be understood that my invention is not intended to be limited to such mechanism and embraces such changes in the same as will suggest themselves to persons skilled in the art.

In the machine illustrated the material of the spoke is forced up into engagement with the adjacent member of the wheel in two ways, as illustrated, by the respective actions of the scraping-clamp and the jamming-clamp. The scraping-clamp acts to literally scrape up and positively displace the external metal of the spoke and pile it up against the hub in the form of a shoulder, while the jamming-clamp acts to bend or jam up against the inner side of the rim a distinct collar or shoulder previously formed on the spoke. My invention embraces both of these actions. In both cases the metal is forced up by a movement of the clamp with relation to the spoke and in the direction of the axis of the spoke. In other words, the clamp moves along the spoke in forcing up the shoulder. It is obvious, however, that the clamp may remain stationary and the spoke be moved bodily endwise with relation to it to cause the outer material of the spoke to be jammed up against the adjacent member of the wheel.

In the operation of the scraping-clamps care should be taken that their engagement with the spoke be such that only the external material of the spoke will be displaced and not such as to upset the spoke bodily endwise.

Having thus described my invention, what I claim is—

1. In a machine of the type described, means for forcing the external material of the spoke at a point between the hub and rim, against the adjacent member of the wheel without disturbing the internal material of the spoke, substantially as described.

2. In a machine of the type described, the combination with a device adapted to engage the spoke between the hub and rim, of means for moving said device along the spoke and in relation to the same, and means for so engaging the said device with the spoke that only the external material of the spoke will be displaced in the form of a shoulder against the adjacent member of the wheel.

3. In a machine of the type described, the combination with means for forming a head or shoulder on the end of the spoke, of means for forcing the external material of the spoke at a point between the hub and rim in engagement with the adjacent member of the wheel without disturbing the interior of the spoke, substantially as described.

4. In a machine of the type described, the combination with means for forming heads on the opposite ends of the spoke respectively outside the rim and inside the hub, of means for forcing the external material of the spoke between the hub and the rim, into engagement with the adjacent member of the wheel without disturbing the internal material of the spoke.

5. In a machine of the type described, the combination with mechanism adapted to act on the end of the spoke, of coöperating mechanism arranged to act on the spoke between the hub and the rim, means for moving said mechanism along the spoke, and means for so engaging said coöperating mechanism with the spoke that only the external material of the same will be displaced.

6. In a machine of the type described, the combination with headers adapted to upset the ends of the spoke respectively outside the rim and inside the hub, of means for jamming a previously-formed shoulder on the spoke against the rim, and means for scraping up the outer material of the spoke against the outer side of the hub.

7. In a machine of the type described the combination with headers movable inward toward the ends of the spoke, of devices adapted to grasp the spoke at the outer side of the hub and inner side of the rim, and means for moving said devices outward in opposite directions respectively toward the inwardly-acting headers.

8. In a machine of the type described, the combination with a heading-tool and means for moving the same against the end of the spoke, of a device adapted to embrace the spoke between the hub and the rim and adjacent to the heading-tool, means for moving the said device outward toward the header, and in relation to the spoke and means for so engaging the said device with the spoke that only the external material will be displaced.

9. In a machine of the type described, the combination with means for holding the hub with its axis horizontal, of means for supporting the rim in a vertical position around the hub, devices for securing the spoke to the rim and hub, and means for moving said devices bodily horizontally in position to act on the spoke.

10. In a machine of the type described, a hub-holder comprising relatively movable rings adapted to engage the ends of the hub.

11. In a machine of the type described, the combination with a sustaining-frame, of two coöperating hub-holding members mounted thereon face to face, means for adjusting said members to and from each other and for fixing them in their adjusted positions to accommodate hubs of different lengths, and independent means for moving said members to and from each other to admit of the insertion and removal of the hub, substantially as described.

12. In a machine of the type described, a hub-holder comrising two coöperating members adapted to grasp and hold the hub between them, said members being adjustable to and from each other and also in a direction transversely of the axis of the hub.

13. In a machine of the type described, a hub-holder comprising two coöperating members adjustable bodily in the direction of the axis of the spoke.

14. In a machine of the type described, the combination of two coöperating members adapted to hold the hub between them, means for adjusting said members to and from each other, means for adjusting them also in the direction of the axis of the spoke, and means for moving them to and from each other independently of the adjusting means.

15. In a machine of the type described, the combination with means for supporting the hub in a horizontal position, of a relatively movable support on which the rim is adapted to rest in a vertical position, and means for moving said support vertically to adjust the rim bodily transversely of the axis of the hub.

16. In a machine of the type described, the combination with means for supporting the hub, of means for supporting the rim around the same, and means for adjusting bodily the position of the rim in a direction transversely of the axis of the hub.

17. In a machine of the type described, the combination with means for supporting the hub, of a roller adapted to support the base of the rim, and means for raising and lowering said roller to adjust the position of the rim with relation to the hub.

18. In a machine of the type described, the combination with means for supporting the base of the rim, of an adjustable stop device for supporting the side of the rim.

19. In a machine of the type described, the combination with means for supporting the rim, of a pin adapted to enter a hole in the rim to steady the same.

20. In a machine of the type described the combination with means for supporting the rim, of a pin adapted to enter a hole in the same and means for moving said pin to and from the rim.

21. In a machine of the type described, the combination with means for supporting the rim, of a pin adapted to enter a hole in the same, and movable from one side of the rim to the other, so as to enter either one of two series of holes.

22. In a machine of the type described, the combination with a support for the base of the rim, of a stop adapted to be engaged by the side of the rim, and a pin adapted to enter a hole in the rim.

23. In a machine of the type described the combination with means for supporting the rim, of a pin adapted to enter a hole in the rim, said pin being movable to and from the rim and also from side to side.

24. In a machine of the type described, the combination of a clamp adapted to close on the spoke between the hub and the rim, means for closing the same on the spoke, means for subsequently moving the clamp bodily toward the end of the spoke and in relation to the same and means for so regulating the pressure of the clamp that only the outer material of the spoke may be displaced.

25. In a machine of the type described the combination of heading-tools movable inward toward each other, of clamps movable outward toward the headers, a cylinder and a piston therein, and operative connections between the piston and the headers and between the piston and clamps, for operating them simultaneously.

26. In a machine of the type described, the combination with clamping devices movable outward from each other, of an operating-head movable between said clamps.

27. In a machine of the type described, the combination of clamps movable outward from each other, of means for moving one a greater distance than the other.

28. In a machine of the type described, the combination of clamps movable outward and formed with inclined adjacent surfaces, of an operating-head provided with inclined surfaces adapted to engage those on the clamps, one of the surfaces on the head being of a greater inclination than the other.

29. In a machine of the type described the combination with movable headers adapted to act on the ends of the spoke, of clamping-jaws adapted to close on the spoke, a cylinder, a piston therein operatively connected with the headers, a second cylinder situated within the first cylinder and open at its rear to the pressure in front of the piston, a piston in second cylinder, operative connections between this piston and the clamps formed to close the clamps on the retraction of the piston, the first cylinder having a constant pressure in front of its piston and in rear of the second piston, means for admitting a high pressure to the first cylinder in rear of its piston, and means for admitting a high pressure to the second cylinder in front of its piston.

30. In a machine of the type described, the combination of a cylinder, a piston therein, spoke-heading devices operated by the advance of the piston, means for admitting a constant pressure in front of the piston, means for admitting a high pressure in rear of the same, a second cylinder situated in the first with its rear end open to the constant pressure, a piston in said second cylinder, spoke-clamping devices operated by the retraction of the second piston, and means for admitting a high pressure in front of the second piston.

31. In a machine of the type described, the combination with clamping-jaws movable bodily in a direction transversely of their clamping movement, of a cylinder and piston, a device controlled by the movement of the piston for closing the jaws, and a jointed connection between the same and the piston; whereby the jaws may be moved bodily with relation to the cylinder.

32. In a machine of the type described, the combination with means for supporting the hub and rim, of spoke-fastening devices, and means for adjusting the same bodily around an axis transversely of the axis of the hub.

33. In a machine of the type described, the combination with means for supporting the hub with its axis horizontal and the rim vertical, of spoke-fastening devices, and means for adjusting the same bodily around a vertical axis.

34. In a machine of the type described, the combination with means for supporting the hub and rim, of a plurality of spoke-fastening devices on opposite sides of the same, and means for operating them alternately to fasten alternately the spokes to the hub and rim in two series.

35. In a machine of the type described, the combination with means for supporting the hub and rim, of a plurality of spoke-fastening devices on opposite sides, and means for adjusting one with relation to the other on an axis transverse to that of the hub.

36. In a machine of the type described, the combination with means for supporting the hub and rim, of a plurality of spoke-fastening devices on opposite sides of the same, and means for adjusting said devices independently on axes transverse to that of the hub.

37. In a machine of the type described, the combination with means for supporting the hub, rim and spoke, of two alternately-acting spoke-fastening devices on opposite sides of the hub, and means for moving them independently to and from each other.

38. In a machine of the type described, the combination with a heading device adapted to act on the end of the spoke, and means for moving the same to upset the end of the spoke, of a device adjacent thereto adapted to act on the spoke near its end, and means for moving said heading device independently of its upsetting movement and in relation to the other device to an inoperative position to widen the space between it and the said device.

39. In a machine of the type described the combination of a main frame, standards rising therefrom, tables sustained by said standards and adjustable thereon around vertical axes, slides mounted on the tables and movable to and from each other, opposing spoke-fastening devices mounted on the slides, and means for supporting the hub, rim and spoke between said devices.

In testimony whereof I hereunto set my hand, this 7th day of August, 1901, in the presence of two attesting witnesses.

EMIL EINFELDT.

Witnesses:
NATH FRENCH,
MAY L. DODGE.